(12) United States Patent
Berto et al.

(10) Patent No.: US 6,710,944 B2
(45) Date of Patent: Mar. 23, 2004

(54) PIVOTING OPTICS MOUNT

(75) Inventors: Thomas E. Berto, Santa Rosa, CA (US); Stephan Richard Clark, Windsor, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/207,365

(22) Filed: Jul. 29, 2002

(65) Prior Publication Data

US 2004/0017618 A1 Jan. 29, 2004

(51) Int. Cl.⁷ .................................................. G02B 7/02
(52) U.S. Cl. ........................................ 359/813; 359/811
(58) Field of Search ................................ 359/813, 811, 359/812, 819, 822, 823

(56) References Cited

U.S. PATENT DOCUMENTS 6,512,642 B1 * 1/2003 Bourcier et al. ............ 359/813

OTHER PUBLICATIONS

Optics And Mechanics, 1999–2000—Newport; Three Axis Rotation "Bell And Socket" Stage—p. 18–8.

* cited by examiner

*Primary Examiner*—Hung X. Dang
(74) *Attorney, Agent, or Firm*—John L. Imperato

(57) ABSTRACT

A pivoting optics mount includes an optical element set on an optics holder that has a pivot element. Three actuators included in the pivoting optics mount maintain a mating of the pivot element with a complementary pivot element. Adjusting the lateral displacement of a tip of one or more of the actuators provides angular adjustment of the optical element. The pivoting optics mount includes a frame that fixes the position of the complementary pivot element relative to the actuators.

18 Claims, 6 Drawing Sheets

PIVOTING OPTICS MOUNT

BACKGROUND OF THE INVENTION

Many types of optical instruments rely on angular adjustments of optical elements within the instruments to align, focus or direct optical beams. For example, angular adjustments of diffraction gratings and reflectors within an optical monochromator are relied upon to direct internal optical beams, enabling the monochromator to analyze spectral content of applied optical signals. As optical instruments become more complex and as optical subsystems within the instruments become more compact, correspondingly more constraints are placed on the angular adjustment systems that are included in the instruments. A commercially available angular adjustment system that includes a ball and socket stage is too large to be included in a physically compact optical subsystem. In addition, placing this type of commercially available angular adjustment system in an optical instrument with an optical element mounted to the stage results in optical beams within the instrument being obstructed by the stage. Accordingly, there is a need for an angular adjustment system that is suitable for use in optical instruments, especially those that are complex and those that include physically compact optical subsystems.

SUMMARY OF THE INVENTION

A pivoting optics mount constructed according to the embodiment of the present invention is physically compact and suitable for inclusion in a variety of optical instruments. The pivoting optics mount includes an optical element set on an optics holder that has a pivot element. Three actuators included in the pivoting optics mount collectively maintain a mating of the pivot element with a complementary pivot element in a frame. Adjusting the lateral displacement of a tip of one or more of the actuators provides angular adjustment of the optical element set on the optics holder. The frame fixes the position of the complementary pivot element relative to the actuators.

DETAILED DESCRIPTION OF THE EMBODIMENT

Figure 1A:
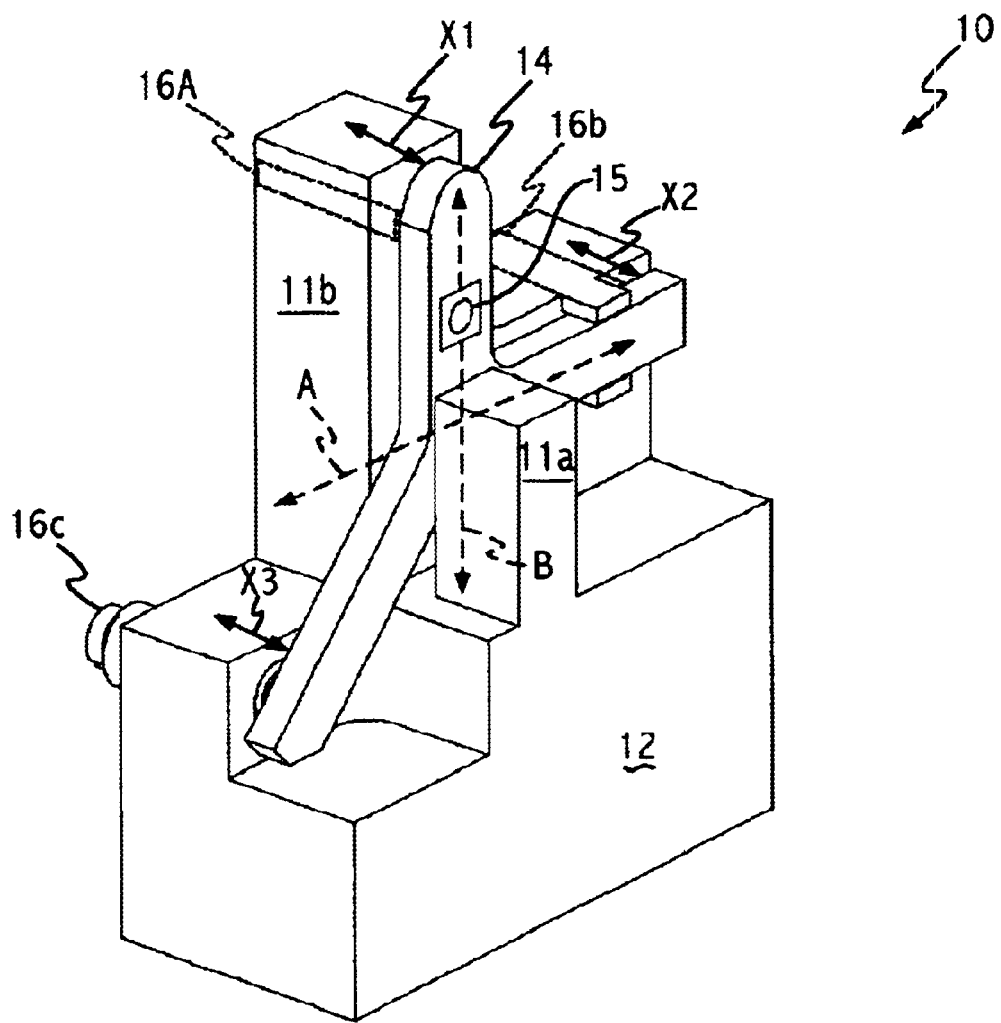
FIG. 1A shows a perspective front view of the pivoting optics mount constructed according to the embodiment of the present invention.
Figure 1B:
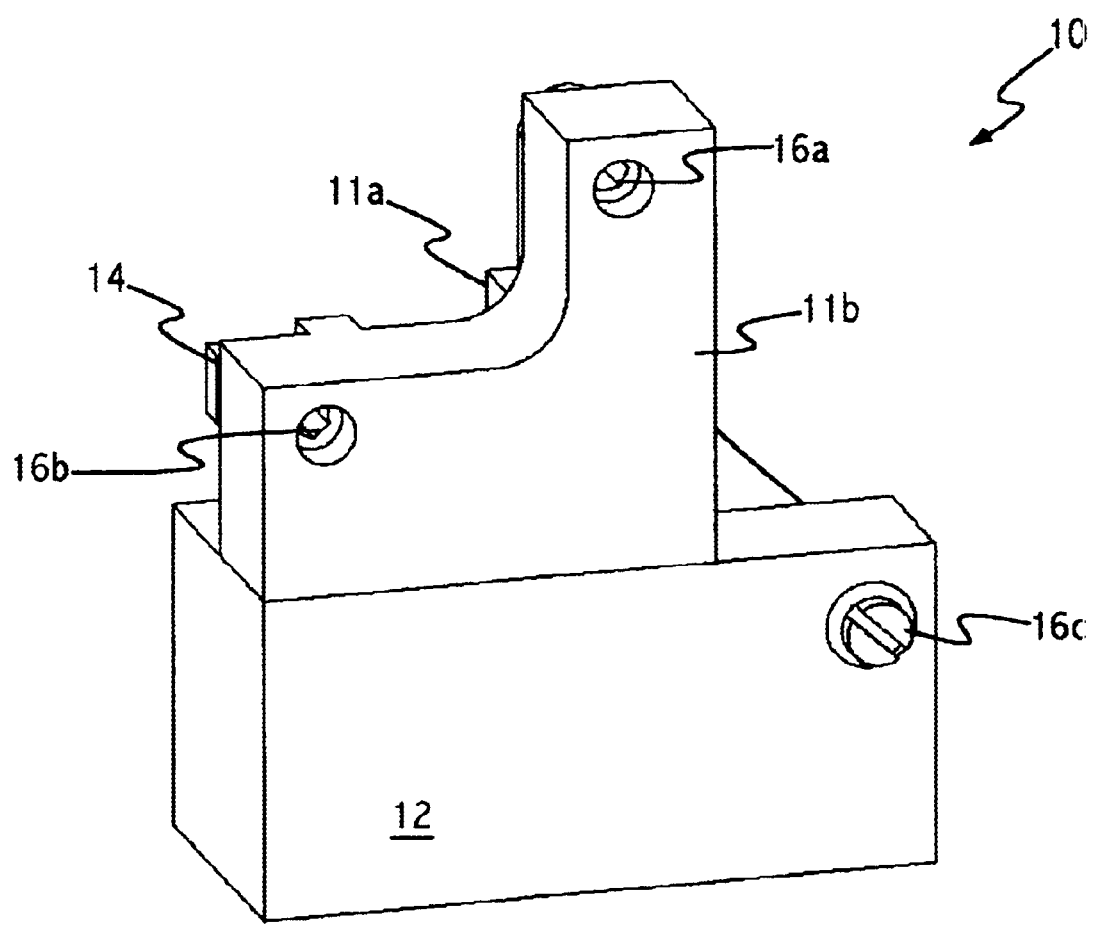
FIG. 1B shows a perspective rear view of the pivoting optics mount constructed according to the embodiment of the present invention.
Figure 1C:
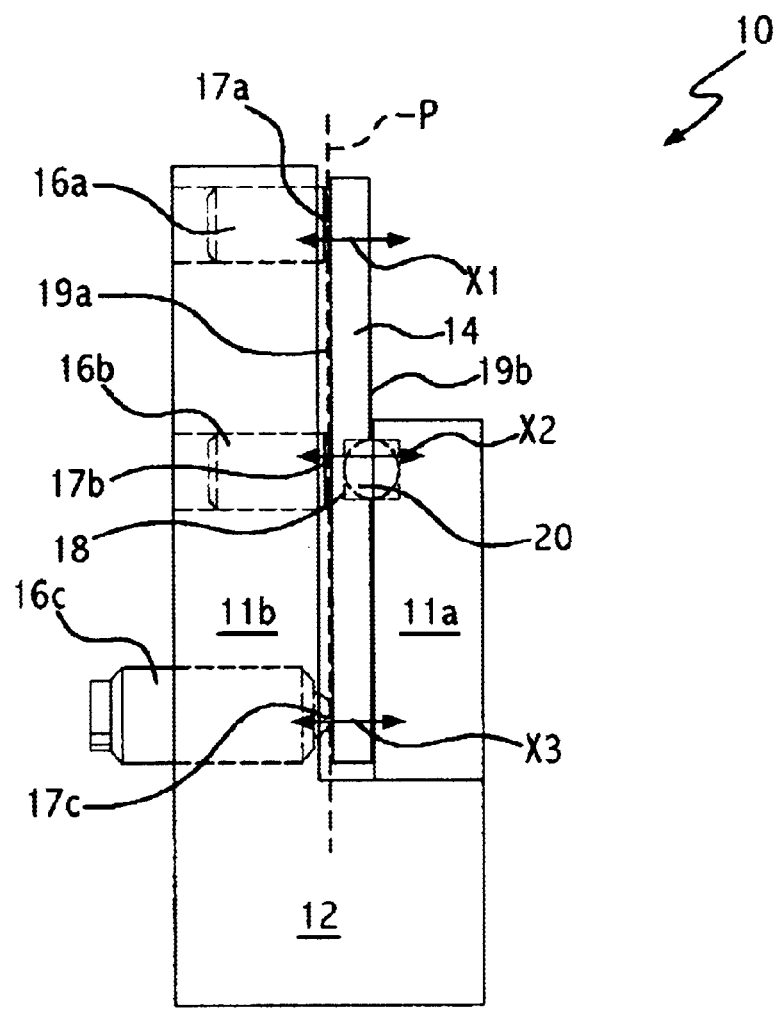
FIG. 1C shows a side view of the pivoting optics mount constructed according to the embodiment of the present invention.
Figure 2:
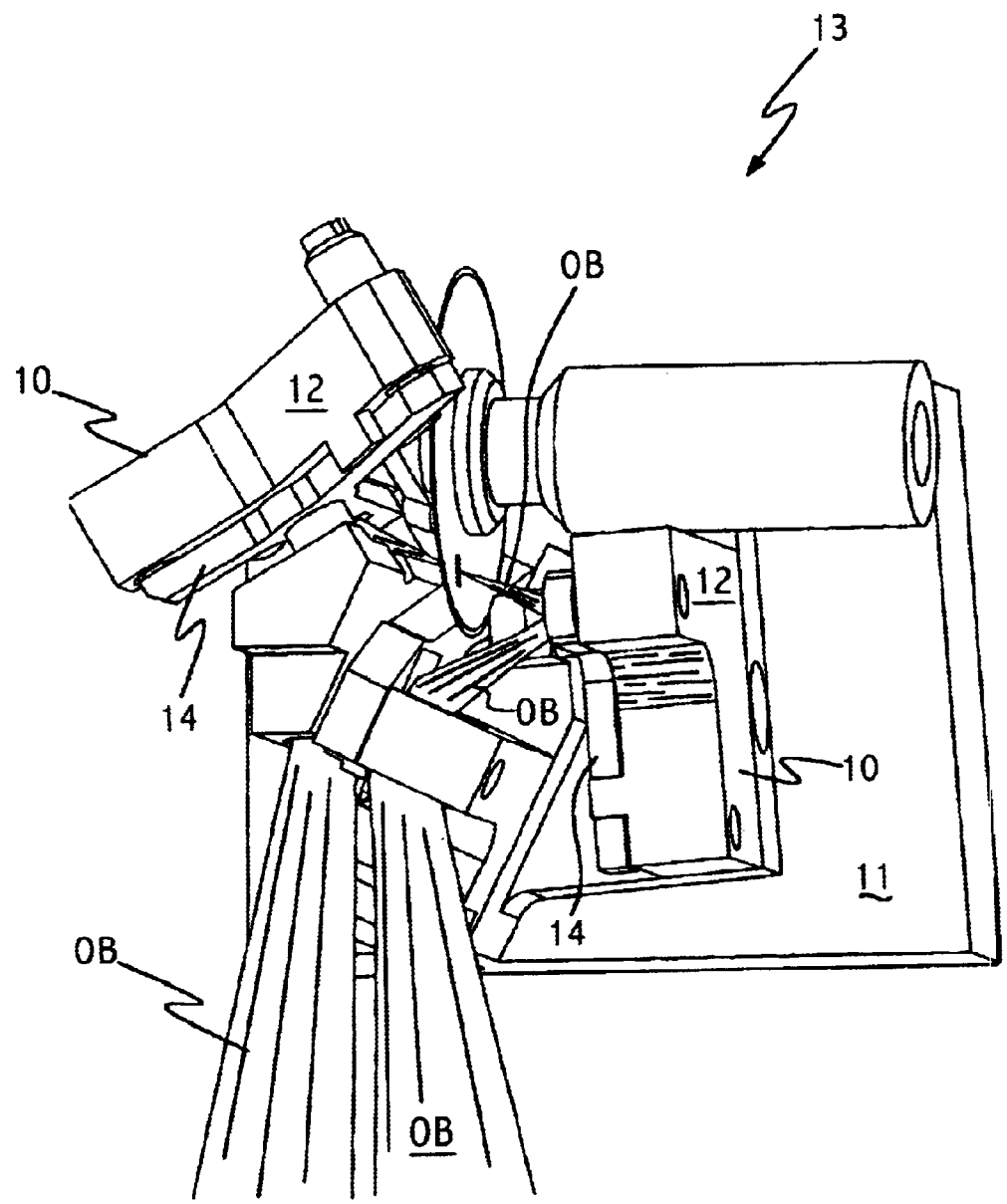
FIG. 2 shows an optical subsystem including multiple pivoting optics mounts.

FIGS. 1A–1C show the pivoting optics mount 10 constructed according to the embodiment of the present invention. The pivoting optics mount 10 is suitable for inclusion in an optical monochromator, spectrum analyzer, interferometer, wavelength meter or other type of optical instrument or system having performance dependent on angular adjustments of an optical element 15. Typically, one or more of the pivoting optics mounts 10 is positioned on an optical stage 11 (shown in FIG. 2) as part of an optical subsystem 13 or module within the optical instrument or system. FIG. 2 shows an example of two or more pivoting optics mounts 10 directing optical beams OB in the optical subsystem 13 of an optical monochromator. Alternatively, the pivoting optics mount 10 is a stand-alone apparatus of custom or re-configurable optical set-ups. A frame 12 enables the pivoting optics mount 10 to be mounted on, or coupled to, a variety of platforms, subsystems, or modules.

Figure 3A:
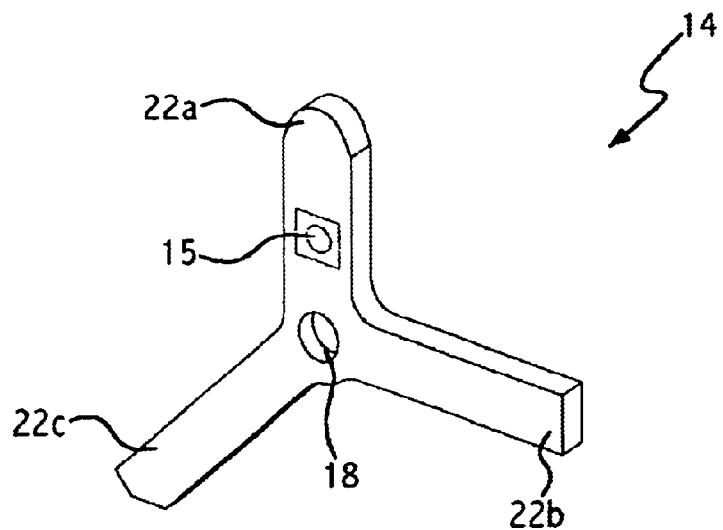
FIGS. 3A–3B show alternative views of an optics holder included in the pivoting optics mount shown in FIFS. 1A–1C.
Figure 3B:
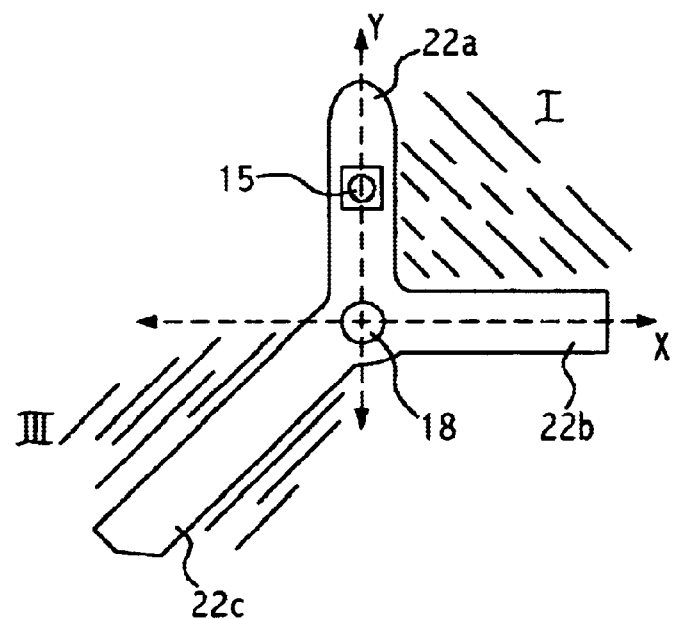

The pivoting optics mount 10 includes an optics holder 14 upon which the optical element 15 is set. FIGS. 3A–3B are views of the optics holder 14 removed from the frame 12 of the pivoting optics mount 10. Typically, the optical element 15 is a mirror, corner reflector, retro-reflector, diffraction grating, aperture, lens, filter, prism, fiber connector, or other optical component. Alternatively, the optical element 15 is an array or a combination of mirrors, corner reflectors, retro-reflectors, diffraction gratings, apertures, lenses, filters, prisms, fiber connectors or other optical components. Typically, the optical element 15 set on the optics holder 14 is a separate element or component from the optics holder 14 and mounted on or to the optics holder 14 using any of a variety of adhesives or fasteners. Alternatively, the optical element 15 is an integral part of the optics holder 14. For example, one or more mirrors, corner reflectors, retro-reflectors or apertures are diamond cut, cast, stamped, or micro-machined directly into the optics holder 14. Known replication techniques suitable for forming these types of optical elements 15 are alternatively used to set the optical element 15 in the optics holder 14.

Figure 4C:
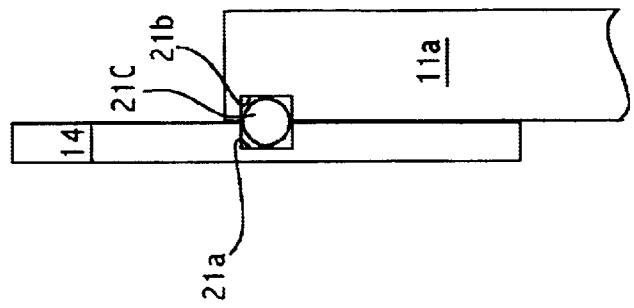
FIGS. 4A–C show detailed views of alternative optics holders included in the pivoting optics mount constructed according to the embodiment of the present invention.
Figure 4B:
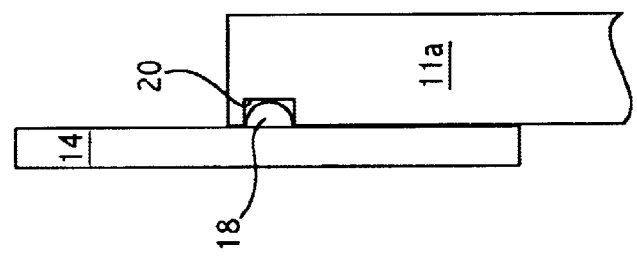
Figure 4A:
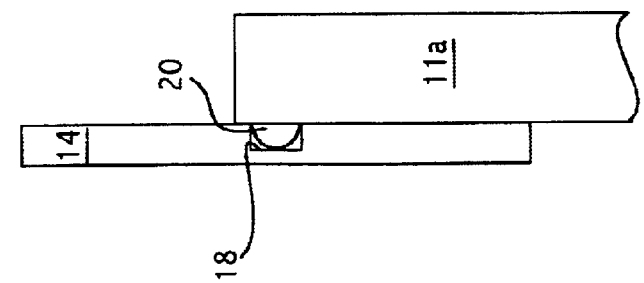

The pivoting optics mount 10 includes three actuators 16a–16c. As shown in the side view of the pivoting optics mount 10 in FIG. 1C, each of the actuators 16a–16c has a corresponding tip 17a–17c that contacts the optics holder 14. The actuators 16a–16c are distributed about a pivot element 18 of the optics holder 14 so that collectively, the actuators provide a resulting force on a side 19a of the optics holder 14 that maintains a mating of the pivot element 18 on a side 19b of the optics holder 14 with a complementary pivot element 20. When the pivot element 18 is a concave recess in the optics holder 14, such as a cylindrical bore having a flat bottom or a curved bottom, a conical bore, or a spherical indentation, the complementary pivot element 20 is a convex protrusion from a frame portion 11a, such as a spherical sector, or a conical pin as shown in the detailed view of FIG. 4A. When the pivot element 18 is a convex protrusion from the optics holder 14, the complementary pivot element 20 is a concave recess in the frame portion 11a as shown in the detailed view of FIG. 4B. In an alternative shown in the detailed view of FIG. 4C, the pivot element 18 and complementary pivot element 20 collectively include concave recesses 21a, 21b in each of the optics holder 14 and the frame portion 11a, and a ball 21c received by the concave recesses.

Lateral displacements x1–x3 of the tips 17a–17c of the actuators 16a–16c relative to a frame portion 11b, provide angular adjustments of the optical element 15 about at least one of two orthogonal axes A, B that lie in a plane P (shown in FIG. 1A) defined by the three tips 17a–17c of the actuators 16a–16c. For example, lateral displacement x1 of the tip 17a of the actuator 16a adjusts the optical element 15 about axis A (shown in FIG. 1A), whereas lateral displacement x2 of the tip 17b of the actuator 16b adjusts the optical element 15 about the axis B.

In the example shown, the actuators 16a, 16b are set screws that engage threaded holes in the frame portion 11b. Lateral displacements x1–x2 of the tips 17a–17b are achieved via rotation of the set screws in the threaded hole. The third actuator 16c is a mechanical plunger that has a lateral displacement x3 resulting from movement of the optics holder 14 in response to the lateral displacements x1, x2 of one or both of the tips 17a, 17b of the actuators 16a, 16b. As alternatives to the set screws and mechanical plunger as shown, the actuators 16a–16c are mechanical positioners, piezo-electric positioners, or the actuators 16a–16c are pneumatic, hydraulic or electric linear translators that are suitable for providing lateral displacements x1–x3 of tips 17a–17c relative to the frame portion 11a.

The frame 12, including the frame portions 11a, 11b, fixes the position of the complementary pivot element 20 relative to the actuators 16a–16c, enabling the force on the side 19a of the optics holder 14 to maintain the mating of the pivot element 18 to the complementary pivot element 20.

The optics holder 14 shown in FIGS. 3A–3B has three arms 22a–22c intersecting at the pivot element 18. In this example, the arms 22a, 22b of the optics holder 14 are orthogonal and define a quadrant I of a coordinate system X-Y, where the pivot element is positioned at an origin of the coordinate system X-Y, as shown in FIG. 3B. The third arm 22c is shown lying in a quadrant III that is nonadjacent to the quadrant I. The three arms 22a–22c enable optical beams OB to pass across the optics holder 14 in the gaps between the arms 22a–22c (shown in FIG. 2), making the pivoting optics mount 10 suitable for inclusion into an optical instrument or system. Alternatively, the optics holder 14 has three or more arms that have relative orientations that are different from those shown in FIGS. 3A–3B. In fact, the optics holder 14 has any of a variety of shapes that accommodate distributions or placements of actuators 16a–16c about the pivot element 18, enabling the actuators 16a–16c to collectively maintain the mating of the pivot element 18 with the complementary pivot element 20. Typically, distributions of actuators 16a–16c wherein the tips 17a–17c are not contained within any single semicircle that is centered about the pivot element 18 and contained within the plane P defined by the three tips 17a–17c of the actuators 16a–16c are suitable.

While the embodiment of the present invention has been illustrated in detail, it should be apparent that modifications and adaptations to this embodiment may occur to one skilled in the art without departing from the scope of the present invention as set forth in the following claims.

What is claimed is:

1. An optics mount, comprising:
   an optics holder having a first pivot element on a first side;
   an optical element set on the optics holder;
   a second pivot element, complementary to the first pivot element;
   three actuators distributed about the first pivot element, each having a tip and contacting a second side of the optics holder, the three actuators maintaining a mating of the first pivot element with the second pivot element;
   a frame fixing the position of the second pivot element relative to the three actuators, wherein laterally displacing the tip of at least one of the three actuators provides angular adjustment of the optical element about at least one of two orthogonal axes lying within a plane defined by the tips of the three actuators.

2. The optics mount of claim 1 wherein the distribution of actuators are not contained within any single semi-circle that is centered about the first pivot element and that lies within the plane defined by the tips of the three actuators.

3. The optics mount of claim 1 wherein the optical element set on the optics holder is integral with the optics holder.

4. The optics mount of claim 2 wherein the optical element set on the optics holder is integral with the optics holder.

5. The optics mount of claim 1 wherein the optics holder has three arms intersecting at the first pivot element.

6. The optics mount of claim 2 wherein the optics holder has three arms intersecting at the first pivot element.

7. The optics mount of claim 3 wherein the optics holder has three arms intersecting at the first pivot element.

8. The optics mount of claim 4 wherein the optics holder has three arms intersecting at the first pivot element.

9. The optics mount of claim 8 wherein a first of the three arms is orthogonal to a second of the three arms, the first arm and the second arm defining a first quadrant of a coordinate system centered about the pivot element, and wherein the third of the three arms lies within a second quadrant of the coordinate system that is nonadjacent to the first quadrant.

10. The optics mount of claim 1 wherein the first pivot element is a concave recess and the second pivot element is a convex protrusion, and wherein maintaining the mating of the first pivot element with the second pivot element includes maintaining penetration of the convex protrusion in the concave recess.

11. The optics mount of claim 2 wherein the first pivot element is a concave recess and the second pivot element is a convex protrusion, and wherein maintaining the mating of the first pivot element with the second pivot element includes maintaining penetration of the convex protrusion in the concave recess.

12. The optics mount of claim 3 wherein the first pivot element is a concave recess and the second pivot clement is a convex protrusion, and wherein maintaining the mating of the first pivot element with the second pivot element includes maintaining penetration of the convex protrusion in the concave recess.

13. The optics mount of claim 1 wherein the first pivot element is a concave recess and the second pivot element is a convex protrusion, and wherein maintaining the mating of the first pivot element with the second pivot element includes maintaining penetration of the convex protrusion in the concave recess.

14. The optics mount of claim 1 wherein the first pivot element is a convex protrusion and the second pivot element is a concave recess, and wherein maintaining the mating of the first pivot element with the second pivot element includes maintaining penetration of the convex protrusion in the concave recess.

15. The optics mount of claim 2 wherein the first pivot element is a convex protrusion and the second pivot element is a concave recess, and wherein maintaining the mating of the first pivot clement with the second pivot element includes maintaining penetration of the convex protrusion in the concave recess.

16. The optics mount of claim 3 wherein the first pivot element is a convex protrusion and the second pivot element is a concave recess, and wherein maintaining the mating of the first pivot element with the second pivot element includes maintaining penetration of the convex protrusion in the concave recess.

17. The optics mount of claim 5 wherein the first pivot element is a convex protrusion and the second pivot element is a concave recess, and wherein maintaining the mating of the first pivot element with the second pivot element includes maintaining penetration of the convex protrusion in the concave recess.

18. The optics mount of claim 1 wherein the first pivot element and the second pivot element include a first cylindrical bore in the optics holder, a second cylindrical bore in the frame, and a ball captured in the first cylindrical bore and the second cylindrical bore between the optics holder and the frame.

* * * * *